United States Patent [19]

Boitiaux et al.

[11] Patent Number: 5,304,693
[45] Date of Patent: Apr. 19, 1994

[54] PROCESS FOR ELIMINATING MERCURY FROM STEAM CRACKING INSTALLATIONS

[75] Inventors: Jean-Paul Boitiaux, Poissy; Patrick Sarrazin, Rueil Malmaison, both of France

[73] Assignee: Institut Francais du Petrole, Rueil Malmaison, France

[21] Appl. No.: 751,008

[22] Filed: Aug. 28, 1991

[30] Foreign Application Priority Data

Aug. 29, 1990 [FR] France .................. 90 10846

[51] Int. Cl.$^5$ .............. B01D 53/02; C07C 4/04; C07C 7/12; C10G 67/02
[52] U.S. Cl. .................. 585/648; 423/210; 585/652; 585/809; 585/822; 208/91; 208/99
[58] Field of Search .............. 423/210, 652; 585/822, 585/823, 652, 648, 809; 55/72; 502/34, 53; 208/251 R, 253, 91, 99

[56] References Cited

U.S. PATENT DOCUMENTS

| | | | |
|---|---|---|---|
| 3,755,989 | 9/1973 | Fornoff et al. | 55/72 |
| 3,864,460 | 2/1975 | Connell | 423/574 |
| 4,892,567 | 1/1990 | Yan | 55/72 |
| 4,911,825 | 3/1990 | Roussel et al. | 423/210 |
| 4,982,050 | 1/1991 | Gammie et al. | 423/210 |
| 4,983,277 | 1/1991 | Audeh et al. | 208/251 R |
| 5,107,060 | 4/1992 | Yan | 585/823 |

FOREIGN PATENT DOCUMENTS 2012344  9/1990  Canada .
89/3265  4/1990  South Africa .

OTHER PUBLICATIONS

Patent Journal of the Republic of South Africa, vol. 23, #4 (Apr. 1990), p. 188, abstract of South Africa Patent Publication 89/3265, published Feb. 27, 1990.

Primary Examiner—Wayne Langel
Assistant Examiner—Peter T. DiMauro
Attorney, Agent, or Firm—Millen, White, Zelno & Branigan

[57] ABSTRACT

A process for the elimination of mercury from an overall steam cracking installation, characterized in that regeneration is terminated by the injection of regeneration gas onto an active demercurizing mass, such that there is substantially no trace of mercury in the air or liquids leaving the installation. The process involves the use of three demercurizing masses, namely two upstream of the installation which are in series and one downstream, which latter is demercurized by at least one of the upstream masses. The use more particularly applies to the depollution of steam cracking installations which are already polluted by mercury.

10 Claims, 1 Drawing Sheet

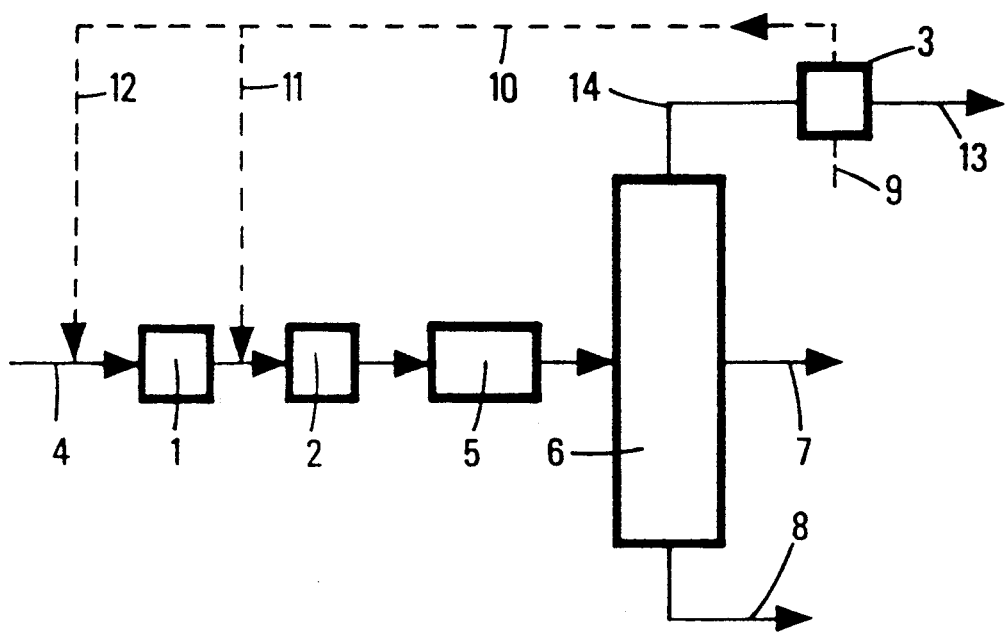

PROCESS FOR ELIMINATING MERCURY FROM STEAM CRACKING INSTALLATIONS

BACKGROUND OF THE INVENTION

It is known that liquid condensates constituting the byproducts of gas production (natural gas, associated gas) and crude oil can contain numerous metallic compounds in the trace state and in particular mercury.

These charges are increasingly steam cracked and the consequence of this is to produce effluents polluted by mercury. The catalysts of the transformation processes located downstream of the steam cracking process are consequently severely poisoned, which in certain cases makes the gas condensates economically less attractive. In addition, mercury may also cause corrosion through the formation of amalgams with aluminium-based alloys, particularly in sections of the plant operating at a sufficiently low temperature to cause the condensation of liquid mercury (cryogenic fractionation, exchangers).

The prior art discloses numerous products having an interesting demercurizing activity. Thus, there are masses constituted by active carbon impregnated with sulphur or iodine in U.S. Pat. No. 3,194,629 and copper oxide in U.S. Pat. No. 4,877,920. U.S. Pat. No. 4,843,102 claims the use of a polysulphide-impregnated resin, as does U.S. Pat. No. 4,877,515, which deposits these polysulphides on a molecular sieve. According to U.S. Pat. Nos. 4,892,567 and 4,874,525 sometimes the molecular sieve is impregnated by a metal known to form amalgams such as gold or silver. U.S. Pat. No. 3,194,629, assigned to Institut Francais du Pétrole (IFP) describes other masses incorporating copper at least partly in the sulphide form and a mineral support.

These different masses are very effective for trapping the metallic mercury, but relatively ineffective when the metal is combined in the form of dimethyl mercury or mercury compounds having hydrocarbon chains containing two or more carbon atoms and optionally other non-metallic elements (sulphur, nitrogen, etc.). In order to ensure a complete elimination of the mercury in all cases, IFP has described two processes constituted by two reaction zones in series containing two masses preferably used in series, the first carrying out the hydrogenolysis of the organometallic compounds in the presence of hydrogen and the second trapping most of the mercury contained.

Thus, French patent application FR-A-89/03581 describes the first catalyst as containing at least one metal M from the group constituted by nickel, cobalt, iron and palladium and followed by or mixed with a trapping mass containing sulphur or a metal sulphide.

French patent application FR-A 89/03500 describes the first catalyst as containing at least one metal M chosen from the group formed by nickel, cobalt, iron, palladium and platinum, at least one metal N chosen from the group formed by chromium, molybdenum, tungsten and uranium followed by or mixed with a mercury trapping mass containing a sulphide of at least one metal P chosen from the group formed by copper, iron and silver, or sulphur.

As these two processes operate in the presence of hydrogen, they cannot be used on cracked gases, which contain significant quantities of unsaturated compounds. It is therefore necessary to use them upstream of the steam cracker, while pretreating the charge. Such a situation is very interesting, because it makes it possible to ensure the elimination of the mercury from the entire installation on all the unsaturated fractions produced. It also prevents mercury pollution of installations in contact with the cracked gases prior to their separation into different fractions.

Nevertheless many steam cracking installations (zones) have operated with mercury-polluted charges without using any mercury elimination technology at all. In this case the complete installation is polluted by mercury and the limited, but not negligible, steam affinity for of this metal means that even the mercury-free effluents, because the steam cracker charge has been treated, could again become charged with mercury.

It is also standard practice to "import" unsaturated fractions in addition to those produced in situ in order to increase the flexibility of the installation. In this case it is not sufficient to eliminate the mercury from the steam cracker charge and it is also necessary to install trapping masses on the cracked products. In this case it is possible to use the various products referred to hereinbefore, but they all suffer from the disadvantage of a polluting reprocessing.

Thus, resins must be treated with solutions which entrain the trapped mercury, which imposes expensive downstream treatments. Carbons must be burned in order that it is possible to recover the active phase deposited on their surface, which causes a problem of serious pollution of the combustion fumes, which are seriously polluted by the volatile mercury. Molecular sieves are usually regeneratable, but here again it is necessary to have an installation making it possible to eliminate the mercury from the regeneration effluents.

However, the mercury trapping masses used upstream, like those described in French Application FR-A-89/03581 and 89/03500 are mineral products which have a composition similar to the ores containing the mercury. It is therefore standard practice to treat such solids in order to extract therefrom the metallic components and also the mercury contained.

SUMMARY OF THE INVENTION

The object of the present invention is therefore to propose a process making it possible to eliminate the mercury from steam cracker charges containing the same, to eliminate the mercury from already polluted installations and to allow the joint treatment of fractions unsaturated from the outside, even if the latter contain mercury. This mercury elimination takes place without any risk to the environment, in that there is essentially no trace of mercury in the air or in the liquids leaving the steam cracking zone.

BRIEF DESCRIPTION OF THE DRAWINGS

The invention is illustrated by the attached drawing which is a schematic flowsheet.

DETAILED DESCRIPTION OF THE PREFERRED EMBODIMENTS

The process involves a minimum of three different masses used in the following way:

The steam cracker charge or at least the part thereof containing the mercury compounds arriving by pipe 4 is hydrogenolysed on a first mass, designated Mass 1 in the drawing. This mass can be any random mass proposed in the aforementioned Patents of the IFP.

Thus, the mercury of the charge is transformed into metallic mercury, no matter what its original form, which enables it to be trapped by the second mass, designated Mass 2 in the drawing. The composition of this mass can e.g. be that described in the two aforementioned Patents.

The total demercurized charge is then introduced into different steam cracking furnaces 5. On leaving the quenching section the cracking products are separated in a primary fractionating column (zone) into a column head 14 constituted by gaseous products referred to as cracked gases, a side stream 7 constituted by petrol and a column bottom 8 constituting the quenching oil.

Experience has shown that despite its high boiling point the possibly present mercury concentrates in the cracked gases. The reason for this behaviour is not precisely known. Probably the mercury is closely associated with the unsaturated compounds contained in large quantities in the light products.

Therefore a third protective mass is placed on this cracked gas flow forming Mass 3 in the drawing. This mass can be any of the masses disclosed by the prior art, provided that it is regeneratable by a thermal treatment under a gas flow. It is possible to use molecular sieves on which can optionally be deposited metals or other active species. This mass will provide protection in the case where the charge purification system allows the passage of mercury. The cracked gases finally pass out of Mass 3 by the pipe 13. If an unsaturated hydrocarbon fraction is fed in from the outside and may contain mercury, it can be injected together with the cracked gases of the steam cracker upstream of said third trapping mass.

The interest of such an arrangement of different masses is obvious if account is taken of the regeneration. The latter takes place with a gas, e.g. ethane which, arriving by the pipe 9, entrains the mercury adsorbed on the Mass 3, said mercury being in the metallic state and being trappable by at least one of the upstream masses, preferably Mass 2. This injection takes place on Mass 1 by pipes 10 and 12 or on Mass 2 by pipes 10 and 11. Thus, it would e.g. be possible to inject regeneration gas onto Mass 2 by pipes 10 and 11 where it is freed from the mercury contained therein. Therefore it represents no danger to the environment and can be injected into cracking furnaces where it is transformed into ethylene. The presence of a gas-liquid separation zone on the path of the regeneration gas prior to its demercurization by at least one other mass makes it possible to recover at least 89% by weight of the mercury, due to at least one purging system, and in the form of liquid mercury.

In the case where the dimension of the cracked gas separation system does not make it possible to inject import fractions upstream of the cold section, such a fraction could be injected directly downstream, e.g. by mixing it with the fraction $C_3$ if a $C_3$ fraction is being imported. In this case it would be necessary to have a charge of the same type on the $C_3$ fraction only, which could be regenerated in the same way by supplying regeneration gases for mixing with the charge upstream of the steam cracker or a two-bed demercurization system would be installed.

In the case that it is wished to purify a steam cracking unit previously contaminated by mercury, it is probable that this mercury has been deposited in the cold box. In this case it will be necessary to place the regeneratable trapping masses on the separate products, i.e. on the $C_2$, $C_3$ and $C_4$.

It is obvious that any combination of masses, with regeneration and reinjection of regeneration effluents on one of them, if it ensures that virtually no trace of mercury is contained in the air or liquids leaving the unit, falls within the scope of the present invention.

EXAMPLE 1

(according to the invention)

Three different masses are prepared, which are referred to hereinafter as Masses 1, 2 and 3 and which are prepared in the following way:

1) Mass 1: Mass constituted by nickel on macroporous alumina prepared according to French Application FR-A-88/03258.

2) Mass 2: Mass constituted by copper sulphide deposited on an alumina support according to U.S. Pat. No. 4,094,777.

3) Mass 3: Mass constituted by a zeolite Y exchanged with silver according to U.S. Pat. No. 4,874,525.

EXAMPLE 2

(comparison)

500 cm$^3$ of Mass 3 are fed into a diameter 5 cm steel reactor. After nitrogen purging into the reactor is passed a rising flow of n-hexane in which mercury has been dissolved at a rate of 1 milligramme/liter. The test conditions are charge flow rate 5 l/h, temperature 20° C. and duration 200 h. The mercury analyses performed on leaving the reactor revealed no trace of mercury throughout the test.

This was followed by the regeneration of said mass by supplying 100 l/h of ethane in a downward flow, at atmospheric pressure and 325° C. The effluents were cooled to 20° C. and introduced into a liquid-gas separator equipped with a liquid purge. During the first two hours of treatment, the mercury analyses performed in the gas leaving the separator indicate the presence of mercury, with concentration points up to 50 microgrammes/liter. During this time period, through the purge a liquid mercury mass was recovered of 890 mg. Thus, a non-negligible mercury quantity is not trapped by such a process.

EXAMPLE 3

(according to the invention)

500 cm$^3$ of each mass are charged into three identical diameter 5 cm steel reactors. Mass 1 is charged into reactor 1, mass 2 into reactor 2 and mass 3 into reactor 3. Masses 2 and 3 are purged with nitrogen and mass 1 undergoes a treatment for 8 hours, under a hydrogen flow of 200 l/h, at a pressure of 2 bars and at a temperature of 400° C.

The procedure is then exactly the same as in Example 2 for charging the mass 3 with mercury and then regeneration is carried out in the same way. However, the effluents are washed in an absorption column by a heavy liquefied gas condensate boiling in the boiling point range 30° to 350° C. and containing 50 ppb of mercury. This naphtha, after contact with the regeneration gas, is passed with the hydrogen in an upward flow onto the mass at a charge flow rate of 5 l/h, a temperature of 180° C., a pressure of 30 bars and a hydrogen flow rate of 20 l/h.

On leaving the reactor 1 the effluents are cooled to 20° C. and passed in an upward flow onto the mass 2. No trace of mercury is revealed by the analysis of the gaseous effluents of the absorption column and the liquid effluents of the reactor 2. Thus, this process provides a total elimination of the mercury from the installation.

EXAMPLE 4

(according to the invention)

The preceding experiment was repeated by interposing a gas-liquid separator between the reactor 3 and the absorption column. Analyses of the liquid and gaseous effluents reveal no trace of mercury. The purge of the separator made it possible to recover 897 mg of liquid mercury. Thus, as a result of this process only liquid mercury passes out of the installation and this can be used for all the applications of metallic mercury known to the Expert.

EXAMPLE 5

(according to the invention)

Example 2 is repeated, but the gas-liquid separator is replaced by the reactor 2 containing the mass 2. All the mercury analyses performed on the gaseous effluents of the reactor 2 reveal no trace of mercury.

EXAMPLE 6

(according to the invention)

Example 2 was repeated, but while passing the gaseous effluents from the gas-liquid separator onto reactor 2 containing mass 2. All the mercury analyses performed on the gaseous effluents of reactor 2 reveal no trace of mercury. 899 mg of mercury were recovered in the separator liquid purge.

EXAMPLE 7

(according to the invention)

Example 3 was repeated, but the gaseous effluents of the reactor 3 being regenerated were compressed to 30 bars and these gases were injected into the reactor 2 in the naptha complement leaving reactor 1. No trace of mercury is detected in the analyses performed at the outlet from reactor 2.

EXAMPLE 8

(according to the invention)

Example 7 was repeated, but a gas-liquid separator was interposed between the reactor 3 and the compressor. The analyses reveal no trace of mercury on leaving the reactor 2 and 898 mg of mercury were recovered on purging the separator.

We claim:

1. In a process comprising providing a hydrocarbon charge contaminated with mercury, passing the mercury-contaminated hydrocarbon charge through at least one demercurizing mass upstream of a steam cracking zone, passing the resultant mercury-depleted hydrocarbon charge to said steam cracking zone so as to crack said hydrocarbon charge, and separating a gaseous hydrocarbon effluent from said steam cracking zone, the improvement comprising passing said gaseous hydrocarbon effluent through at least one regenerable demercurizing mass downstream of said steam cracking zone so as to remove residual mercury from said effluent, passing a heated regeneration gas through said downstream regenerable demercurizing mass, thereby obtaining a gaseous regenerating effluent containing mercury, and passing at least part of said gaseous regenerating effluent into at least one upstream demercurizing mass.

2. A process according to claim 1, comprising passing said mercury-contaminated hydrocarbon charge through at least two demercurizing masses upstream of the steam cracking zone.

3. Process according to claim 2 wherein there are two masses upstream of the steam cracking zone that are in series and wherein the first of the two masses serves to hydrogenolyse mercury-based organometallic compounds and the second of the two masses traps metallic mercury.

4. A process according to claim 3, wherein the first upstream mass contains at least one catalyst incorporating at least one metal from the group consisting of nickel, cobalt, iron and palladium followed by or mixed with a trapping mass incorporating sulphur or at least one metal sulphide.

5. A process according to claim 3, wherein the gaseous regenerating effluent bypasses the first mass and passes into the second mass.

6. A process according to claim 3, wherein the catalyst of said first upstream mass incorporates at least one metal M of the group consisting of nickel, cobalt, iron, palladium, and platinum, and at least one metal N chosen from the group consisting of chromium, molybdenum, tungsten, and uranium; and said second upstream mass, which is mixed with or is downstream from said first upstream mass, is a mercury trapping mass incorporating sulfur or at least one sulfide of at least one metal P chosen from the group consisting of copper, iron, and silver.

7. A process according to claim 2, wherein the gaseous regenerating effluent is at least partly passed into the charge before passing into the at least two demercurizing masses upstream of the steam cracking zone.

8. A process according to claim 1, further comprising an intermediate step of passing said gaseous regenerating effluent to a gas-liquid separating zone prior to its demercurization by at least one upstream demercurizing mass to recover mercury therefrom.

9. A process according to claim 1, wherein the regenerating gas is ethane.

10. A process according to claim 1, further comprising passing the regenerating gas into the steam cracking zone after demercurization.

* * * * *